United States Patent [19]
Bacon et al.

[11] Patent Number: 5,379,022
[45] Date of Patent: Jan. 3, 1995

[54] THERMISTOR DEVICE WITH EXTENDED OPERATING RANGE

[75] Inventors: Glade B. Bacon, Everett; Heber P. Farnsworth, Snohomish, both of Wash.

[73] Assignee: Fluke Corporation, Everett, Wash.

[21] Appl. No.: 57,170

[22] Filed: May 3, 1993

[51] Int. Cl.⁶ ............................................. H01C 7/10
[52] U.S. Cl. .................................. 338/20; 338/21; 338/22 R; 338/22 SD; 338/48; 338/295; 338/320; 361/56; 361/106
[58] Field of Search ............ 338/20, 21, 22 R, 22 SD, 338/48, 295, 320; 219/505; 361/54, 106, 56, 57

[56] References Cited

U.S. PATENT DOCUMENTS

| | | | |
|---|---|---|---|
| 3,805,022 | 4/1974 | Kulwicki et al. | 219/505 |
| 3,976,854 | 8/1976 | Ishikawa et al. | 338/22 R X |
| 4,068,281 | 1/1978 | Harnden, Jr. | 361/106 |

Primary Examiner—Marvin M. Lateef
Attorney, Agent, or Firm—Dellett and Walters

[57] ABSTRACT

A thermistor device includes plural thermistor elements in series, one or more of which is shunted with a varistor so that if such thermistor heats up and drops excessive voltage, the current therethrough is diverted to the varistor until other thermistors in series also heat to a high resistance state. The thermistor and varistor elements are thermally joined so that the various thermistor elements are rapidly brought up to temperature and prevent prolonged voltage drop across a protective varistor.

21 Claims, 3 Drawing Sheets

THERMISTOR DEVICE WITH EXTENDED OPERATING RANGE

BACKGROUND OF THE INVENTION

The present invention relates to a positive temperature coefficient thermistor device and particularly to such a device adapted to withstand relatively high voltages.

Current limiting device 10 in FIG. 1 suitably comprises a positive temperature coefficient (PTC) thermistor typically taking the form of a barium titanate bulk element or slug through which electrical current passes to a sensitive measuring instrument or other protected circuit 16. The thermistor limits input current while a shunt voltage limiting device 18 is connected specifically across circuit 16 for protecting circuit 16 from excessive voltage levels. Typically, the clamping voltage of voltage limiting device 18 is much less than the rated operating voltage of current limiting device 10. Under normal operating conditions the thermistor exhibits a low resistance, but if an excessively high voltage is applied to the entire circuit including the thermistor, circuit 16 and device 18, or if a short occurs in circuit 16, the thermistor heats in response to the passage of current and its resistance increases many orders of magnitude for current limiting. A typical high voltage thermistor as commercially available is able to withstand about 660 volts appearing thereacross on a cyclic basis. However, for instruments such as digital multimeters wherein a voltage on the order of 1000 volts may be inadvertently applied across a pair of input terminals or probes, a series thermistor must be able to withstand high voltage levels.

Referring to FIG. 2, application of predetermined voltage between metalized ends of barium titanate thermistor body 10 causes the series resistance of the device to increase for circuit protection. However, a voltage higher than rated voltage may damage the thermistor. It may appear that merely lengthening the body (i.e., increasing dimension L in FIG. 2) would increase the voltage at which the device operates. Unfortunately, this is not the case. Assume a given thermistor has a length and diameter of L and D respectively, and operates reliably at a voltage Va, i.e. is capable of having a voltage Va applied and removed repeatedly. If a second thermistor is constructed with identical material and diameter, but a length 2 L, it will often not operate reliably at a voltage 2 Va.

Due to the crystalline makeup of a PTC thermistor, the manufacture of a completely homogeneous structure having the same resistivity throughout is not very likely. Therefore, instead of heating up all at once, thermistor 10 in FIG. 2 can develop a hot spot 12 particularly when a voltage above rated voltage is applied across the thermistor. The hot area exhibits increased resistance, dropping a disproportionate share of the thermistor voltage and resulting in excessive local power dissipation. The action is cumulative in positive feedback fashion. Although for normal thermistors operating within ratings, heat is quickly conducted to other parts of the body whereby a high resistance is produced which is distributed over the entire thermistor, the hot spot phenomenon effectively limits the voltage rating of the device.

Thus, if 2 Va is applied across the ends of a thermistor of length 2 L, this higher voltage may at first be primarily concentrated in the same small cross section 12 and the heat produced isn't dissipated fast enough. Failure can take place as a result of two mechanisms. First, the large thermal gradient at the hot spot can cause the thermistor to crack as a result of mechanical stress since the thermistor body is quite brittle. Secondly, the large voltage gradient at this point can cause arc over and conductive tracing on the body surface.

SUMMARY OF THE INVENTION

In accordance with the present invention, means are added to force a more uniform distribution of voltage and power in a thermistor body during heat-up. In particular, plural thermistor means are disposed in series and one or more varistors are shunted across the thermistor means.

In a series circuit of two or more thermistors, providing a net operating voltage of, say, twice that of one thermistor, a metal oxide varistor (MOV) is shunted across one of the thermistors such that when this thermistor develops a hot spot and drops a disproportionate share of the total voltage applied, the varistor knee voltage is reached whereby the varistor conducts large amounts of current around the thermistor thereby protecting the same. Meanwhile, the remaining thermistors will have had time to heat and drop sufficient voltage such that the voltage drop across the first thermistor is not excessive. As a consequence, the thermistors in series develop the intended resistance to protect a meter circuit without risking fracture or damage to individual thermistors.

In accordance with a preferred embodiment of the present invention, one or more thermistors with one or more varistors disposed in shunt relation therewith are disposed in thermally conductive contact so that the heat provided when the varistor conducts aids in raising the temperature of the bulk thermistor material for rapidly eliminating the hot spot.

It is accordingly an object of the present invention to provide improved protection for measuring instruments and the like.

It is a further object of the present invention to provide an improved thermistor device having extended operating voltage.

It is another object of the present invention to provide an improved thermistor device which can protect against the application of excessive voltage without fracturing or otherwise becoming ineffective.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DETAILED DESCRIPTION

Figure 1:
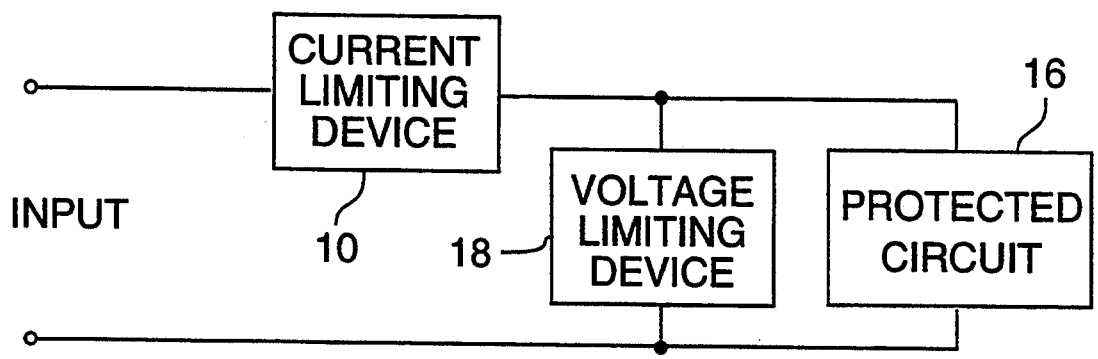
FIG. 1 is a block diagram of a typical instrument protection circuit.
Figure 2:
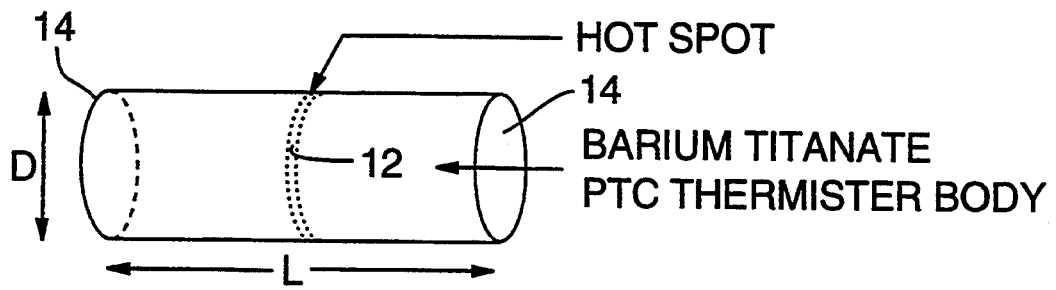
FIG. 2 is a perspective view of a conventional barium titanate thermistor slug.
Figure 3:
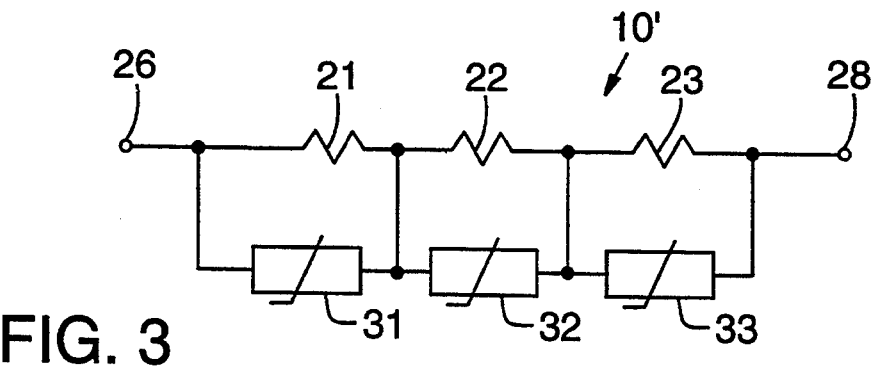
FIG. 3 is a circuit diagram of an improved thermistor device in accordance with the present invention.

Referring to FIG. 3, a circuit for an improved thermistor device according to the present invention includes PTC thermistors 21, 22 and 23 disposed in series between terminals 26 and 28. Across the respective thermistors 21, 22 and are shunted individual metal oxide varistors 31, 32 and 33. It is understood this combination is adapted to replace thermistor 10 in FIG. 1.

If Vn is the knee voltage for each of the varistors, i.e., the voltage at which such varistor conducts substantial amounts of current, then each thermistor in FIG. 3 is selected to have a reliable operating voltage greater than Vn, the varistor knee voltage. However, each thermistor normally heats to its Curie temperature and transitions to a high resistance state at a voltage lower than Vn the knee voltage of the associated varistor.

It is assumed that individual thermistors in the FIG. 3 circuit are equivalent to one prior art thermistor, and that the circuit will encounter about twice the voltage which an individual thermistor would protect against. Consider the circuit of FIG. 3 with a DC voltage of 2.5 Vn applied wherein Vn is the knee voltage of the varistors. Due to the physical make-up of the individual thermistors and the inevitable mismatch between thermistors 21, 22 and 23, one of the thermistors, e.g. thermistor 22, can heat to its Curie temperature and transition to its high resistance state before thermistors 21 and 23. The voltage across thermistor 22 quickly reaches the knee voltage Vn of varistor 32 whereby varistor 32 now starts to conduct. Since a substantial part of the current theretofore flowing through thermistor 22 in this example is now shunted through varistor 32, thermistor 22 is protected from a hot spot condition dropping ever higher voltages. The current flowing through varistor 32 also flows in series through thermistors 21 and 23 such that thermistors 21 and 23 continue to heat toward their Curie temperature. Once the thermistors 21 and 23 reach their high resistance state, current flow in varistor 32 is substantially reduced and the voltage drop is shared across thermistors 21, 22 and 23 as intended at a higher voltage level than one of the thermistors would be able to accommodate by itself. A substantially uniform distribution of voltage and power is thus forced as among the thermistors 21–23.

It will be apparent that the same basic sequence of events takes place should thermistor 21 or thermistor 23 heat to its Curie temperature and transition first before the other thermistors. In this circuit, three thermistors with a varistor shunting each one are illustrated by way of a preferred example although a greater or lesser number may be employed.

By properly sizing the varistors so that the sum of their Vn operating voltages is greater than the desired rating of protected instrument, then after a given varistor turns on, the other two varistors will not both turn on. Let us assume the instrument rating is 1250 volts, i.e., is designed to withstand voltages up to that value. If the varistors 31, 32 and 33 each have a Vn of 500 volts and 1250 volts, for example, is applied between terminals 26 and 28, then one of the varistors will turn on and shunt a thermistor dropping a disproportionate share of the voltage between terminals 26 and 28. If another thermistor also transitions to a high resistance condition, then a second varistor will also turn on whereby the two varistors in series drop 1000 volts, leaving only 250 volts across the remaining varistor in this instance. Consequently, the remaining varistor will not turn on and an undesirably low resistance shunt path is not provided across the whole circuit.

Figure 4:
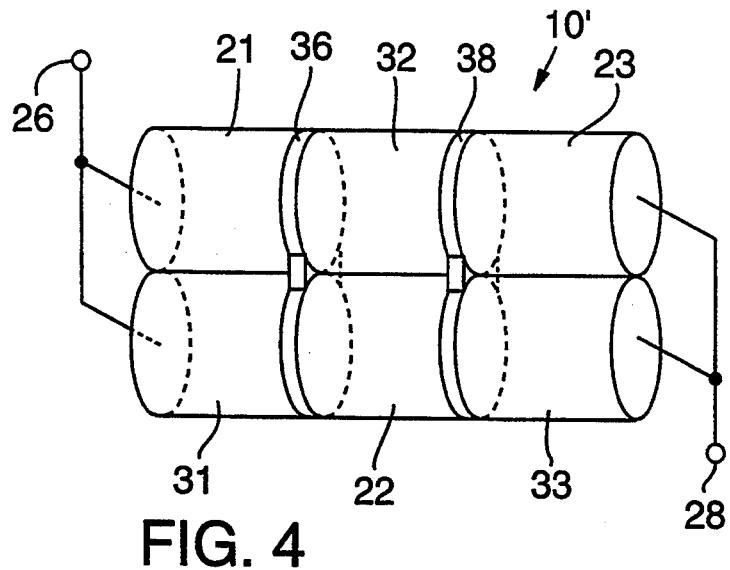
FIG. 4 is a perspective view of an advantageous physical realization of the FIG. 3 device.

It is preferred the thermistors have a low cold resistance whereby as little resistance as possible is normally placed in series with the instrument. It is also desirable that the varistors each have a relatively high knee voltage for optimum voltage protection but a low power rating for reasons of economy. Under these conditions varistor breakdown can occur when voltages greater than Vn are encountered across the terminals 26 and 28. Thus, a varistor in the FIG. 3 circuit may fail before the remaining thermistors heat up adequately, assuming low varistor power ratings as mentioned above. However, in accordance with another feature of the present invention, the thermistors and varistors in FIG. 3 are disposed in heat conducting relation such that, for example, a varistor conducting substantial current transfers heat to thermistors on either side thereof. An advantageous physical construction in accordance with the present invention is illustrated at 10' in FIG. 4 wherein the FIG. 3 circuit is embodied. Each of the thermistors and varistors are formed of bulk material and are provided from readily available commercial sources as equal-sized, solid cylindrical slugs. The elements are disposed in thermally conductive, contacting relation in two adjoining columns oriented horizontally as depicted in FIG. 4, each column comprising three elements in end-to-end relationship. The elements are joined by sheet metal spacers 36 and 38 soldered between the metalized ends of the individual thermistor and varistor slugs. The solder may comprise a heat setting, metal filled epoxy resin. Each spacer, 36, 38, bridges between the columns to complete the series and parallel connections in FIG. 3 as well as to provide additional heat conduction.

It will be noticed, however, that the thermistor and varistor elements 22 and 32 in FIG. 4 are interchanged from their positions in the FIG. 3 circuit diagram so that varistor 32 is better capable of providing heat to thermistors 21 and 23 at either end thereof. Varistors 31 and 33 adjoin thermistor 22 in end-to-end relation for the same reason. This construction enhances rapid heat exchange between these elements and protects the varistors from breakdown.

Figure 5:
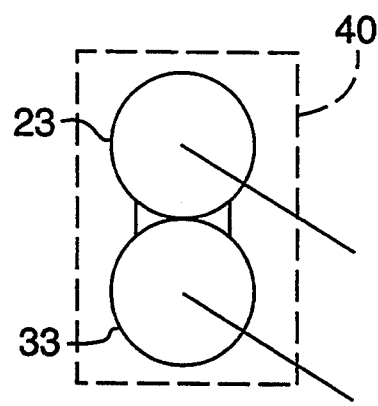
FIG. 5 is an end view of the device as depicted in FIG. 4.

Spacer elements similar to elements 36 and 38 can be secured to thermistor 21 and varistor 31 at one end of the structure, as well as to thermistor 23 and varistor 33 at the other end of the structure for securing the combination in heat conductive relation. The device 10' of FIG. 4 is also advantageously encapsulated in heat conducting but electrically insulating material in the manner illustrated by dashed lines 40 in the end view of FIG. 5. The encapsulation in its simplest form merely comprises a common insulting container, enclosure or package.

Although plural thermistor-varistor shunt combinations are generally disposed in series as hereinabove described particularly for the protection of instrument inputs at higher voltage levels, nevertheless a single thermistor shunted by a single varistor is advantageously employed for protecting the thermistor against excessive voltages. In such case, it is advantageous to employ a fusing element in series with the single parallel combination.

Figure 6:
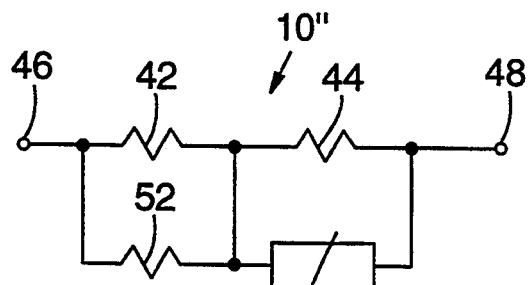
FIG. 6 is a circuit diagram of a thermistor device in accordance with another embodiment of the present invention.

Referring to FIG. 6, illustrating a circuit of a preferred thermistor device 10" according to the present invention, positive temperature coefficient thermistors 42 and 44 are disposed in series between terminals 46 and 48. Thermistor 42 is shunted by another positive temperature coefficient thermistor 52 being relatively equal in size to thermistors 42 and 44. However, thermistor 44 is shunted by metal oxide varistor 54. The circuit can be expanded with further thermistor-varistor combinations disposed in series, so long as at least one thermistor-thermistor combination, such as illustrated at 42, 52, is disposed in the series circuit (or a single thermistor having equivalent properties of the thermistor-thermistor combination, i.e., lower cold resistance).

In the circuit of FIG. 6, the paralleled resistance of elements 42 and 52 is lower than the resistance of element 44 so that, if excessive voltage appears between terminals 46 and 48, thermistor 44 will invariably heat up and transition to its high resistance state first. However, when the knee voltage of varistor 54 is reached varistor 54 will conduct and prevent damage to thermistor 44. Meanwhile, thermistors 42 and 52 also heat above their Curie temperature as current continues to flow therethrough whereby varistor 54 is protected. This circuit has an advantage over the circuit previously described in that a continuous series circuit composed entirely of varistors is avoided between terminals 46 and 48 and therefore the circuit will not break down and conduct heavily when the voltage between terminals 46 and 48 reaches the sum of the varistor knee voltages.

Figure 7:
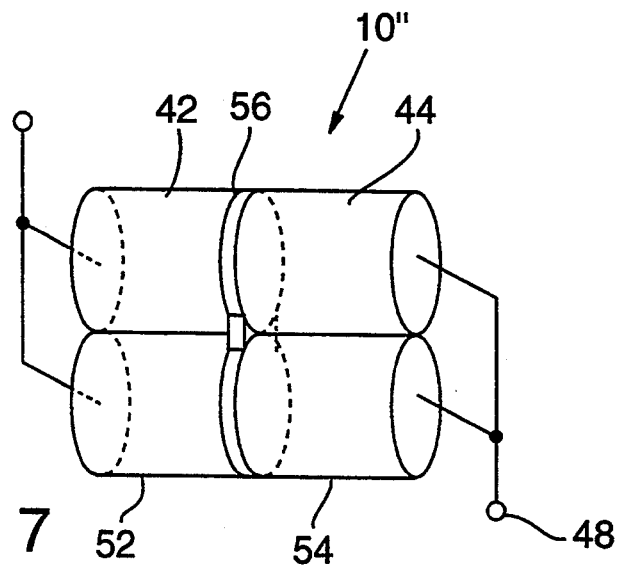
FIG. 7 is a perspective view of a physical realization of the FIG. 6 device.

As in the previous embodiment, the circuit of FIG. 6 is advantageously physically realized employing bulk devices or slugs in the manner illustrated in FIG. 7 wherein cylindrical thermistors 42 and 44 are disposed in one column while thermistor 52 and varistor 54 are disposed in an adjacent column, with a metal spacer 56 separating elements 42, 44 as well as elements 52, 54 in a bridging configuration. The metalized ends at the left hand and right hand ends of the columns as viewed in FIG. 7 may also be joined by means of conducting sheet metal bridge elements similar to element 56. This construction advantageously provides thermal conductivity so that heat from varistor 54 as well as from thermistor 44 rapidly heats elements 42 and 52 to prevent breakdown of varistor 54. Thermistors 42 and 44 in FIG. 7 may be viewed as or provided as a single thermistor means having a tap therealong.

Figure 8:
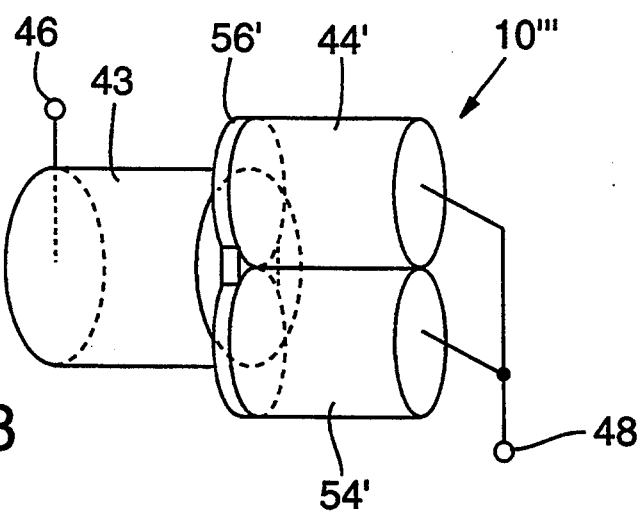
FIG. 8 is a perspective view of an alternative physical realization of the FIG. 6 device.

A further alternative construction is illustrated in FIG. 8 wherein elements 44', 54' and 56' correspond to similarly numbered elements in FIG. 7. However, paralleled PTC thermistors 42 and 52 are replaced by a larger cylindrical slug thermistor 43 having similar characteristics and a lower cold resistance than thermistor 44' so that element 44' always transitions first for dropping a disproportionate share of the voltage between terminals 46 and 48. Operation of this embodiment is the same as described with respect to FIG. 7.

Figure 9:
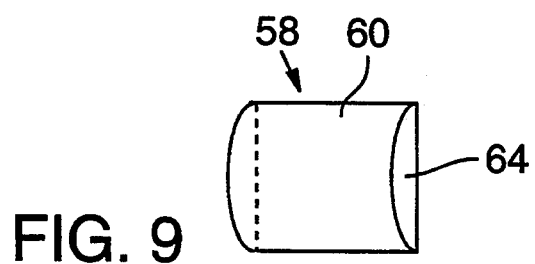
FIG. 9 is a perspective view of a portion of an improved thermistor device according to another embodiment.
Figure 10:
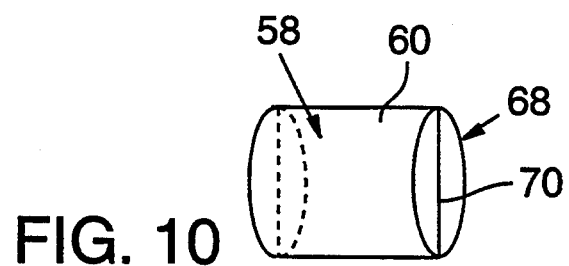
FIG. 10 is a perspective view of a two-part thermistor device according to the last mentioned embodiment.
Figure 11:
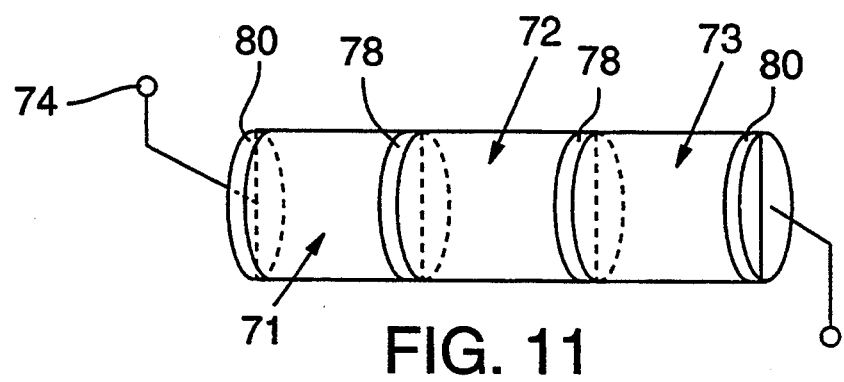
FIG. 11 is a perspective view of a multiple part thermistor device according to the last mentioned embodiment.

A further embodiment according to the present invention is illustrated in FIGS. 9-11. In this embodiment, instead of the thermistor and varistor slugs taking the form of solid cylinders, they comprise half-cylinder segments. Thus, barium titanate thermistor slug 58 in FIG. 9 has a cylindrical outer surface 60 and a flat axial cross sectional face 64. As shown in FIG. 10, slug 58 is joined at its flat axial face to the flat axial face of a similar sized and shaped slug 68 which may comprise a second thermistor or a varistor in accordance with one of the circuits hereinbefore described. The two elements 58 and 68 together comprise a cylindrical configuration having flat ends where the joinder between the two elements is illustrated as describing a diameter 70. Elements 58 and 68 are suitably bonded together at their axial flat surface by means of thermally conductive but electrically insulating adhesive, or can simply be secured together.

Referring to FIG. 11, a plurality of thermistor-varistor combinations 71, 72 and 73, each comprising a half-cylindrical thermistor slug and a half-cylindrical varistor slug, are joined end-to-end by intermediate electrically conductive metal spacers 78 which are soldered therebetween. Similar electrically conductive disks 80 are disposed at opposite ends of the stack and provided with leads to end terminals 74 and 76. If desired, spacers 78 and disks 80 may also be provided with axially extending peripheral flanges for clamping the half-cylindrical elements. It will be seen the described configuration of FIG. 11 suitably embodies the circuit of FIG. 3. Alternatively, the circuit of FIG. 6 can be similarly realized. While an overall cylindrical shape as illustrated in FIG. 11 is of advantage for easy handling, clearly other shapes, such as having a square or rectangular cross section, could be substituted.

Thus, according to embodiments of the present invention an extended operating voltage thermistor device is provided suitable for protecting instrument circuits and the like from the inadvertent application of high voltages, e.g. between input terminals or probes. The series thermistors, especially thermally joined as illustrated, can operate successfully to transition to their high resistance states and protect the instrument without varistor intervention. However, when a disproportionate share of voltage is dropped across one thermistor of the series combination, varistor means shunted thereacross temporarily shunts the hot thermistor until other of the thermistor devices also heat and drop a substantial share of the voltage.

While several embodiments of the present invention have been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A protection circuit adapted to transition from a low resistance state to a high resistance state when a voltage exceeding a predetermined value appears thereacross, said circuit comprising:

a pair of terminals adapted for connection in circuit for coupling a current, and between which a voltage drop is adapted to take place, plural thermistor means disposed in series relationship with one another intermediate said terminals, and a varistor coupled in shunt relation across a given thermistor means of said plural thermistor means so that when the given thermistor means conducts current and the temperature thereof rises to a level causing its share of said voltage drop to exceed a predetermined voltage value, said varistor conducts and protects the given thermistor means until other of said thermistor means in series also rise in temperature to drop a significant proportion of said voltage drop.

2. A protection circuit adapted to transition from a low resistance state to a high resistance state when a voltage exceeding a predetermined value appears thereacross, said circuit comprising:

a pair of terminals adapted for connection in circuit for coupling a current, and between which a voltage drop is adapted to take place, plural thermistor means disposed in series intermediate said terminals, and a varistor coupled in shunt relation across a given thermistor means of said plural thermistor means so that when the given thermistor means conducts current and the temperature thereof rises to a level causing its share of said voltage drop to exceed a redetermined voltage value, said varistor conducts and protects the given thermistor means until other of said thermistor means in series also rise in temperature to drop a significant proportion of said voltage drop, and at least one further varistor coupled in individual shunt relation across another of said thermistor means.

3. The circuit according to claim 2 wherein said thermistor means and said varistors are bulk devices comprising slugs joined in heat conducting relation such that a varistor coupled in shunt relation with one thermistor means is disposed in heat conducting relation with another thermistor means in electrical series therewith.

4. The circuit according to claim 2 comprising three such thermistor-varistor combinations in series.

5. The circuit according to claim 4 wherein thermistor means with varistors connected thereacross are joined to one another in two adjacent columns.

6. The circuit according to claim 5 wherein an individual thermistor means and varistor of a central combination of parallel elements are exchanged in position in said columns relative to thermistor-varistor combinations proximate the ends of said columns so that a center varistor is thermally joined at either end thereof to thermistor means while a center thermistor means is thermally joined at either end to varistors.

7. The circuit according to claim 1 further including enclosure means encapsulating said thermistor devices and varistor in heat conducting relation.

8. The circuit according to claim 1 wherein said thermistor means comprise positive temperature coefficient thermistors.

9. The circuit according to claim 1 wherein said varistor comprises a metal oxide varistor.

10. The circuit according to claim 1 wherein at least ones of said thermistor means and said varistor are disposed in heat conducting relation with one another.

11. A protection circuit adapted to transition from a low resistance state to a high resistance state when a voltage exceeding a predetermined value appears thereacross, said circuit comprising:

a pair of terminals adapted for connection in circuit for coupling a current, and between which a voltage drop is adapted to take place, plural thermistor means disposed in series intermediate said terminals, and a varistor coupled in shunt relation across a given thermistor means of said plural thermistor means so that when the given thermistor means conducts current and the temperature thereof rises to a level causing its share of said voltage drop to exceed a predetermined voltage value, said varistor conducts and protects the given thermistor means until other of said thermistor means in series also rise in temperature to drop a significant proportion of said voltage drop, wherein a said thermistor means other than one shunted by said varistor is of greater net cross section than the thermistor means shunted by said varistor so that the non-shunted thermistor means normally exhibits a smaller cold series resistance in said circuit.

12. A protection circuit adapted to transition from a low resistance state to a high resistance state when a voltage exceeding a predetermined value appears thereacross, said circuit comprising:

a pair of terminals adapted for connection in circuit for coupling a current, and between which a voltage drop is adapted to take place, plural thermistor means disposed in series intermediate said terminals, and a varistor coupled in shunt relation across a given thermistor means of said plural thermistor means so that when the given thermistor means conducts current and the temperature thereof rises to a level causing its share of said voltage drop to exceed a predetermined voltage value, said varistor conducts and protects the given thermistor means until other of said thermistor means in series also rise in temperature to drop a significant proportion of said voltage drop, wherein the thermistor means not shunted by said varistor comprises a pair of thermistor means joined in parallel.

13. The circuit according to claim 1 wherein said thermistor means is substantially unitary and provided with at least one tap therealong for connection to said varistor.

14. An instrument protection circuit which transitions from a low resistance state to a high resistance state, said circuit comprising:

an instrument input line, a pair of terminals between which a current is adapted to flow in series with said input line, thermistor means connected between said pair of terminals, and a varistor coupled in shunt relation across said thermistor means to protect said thermistor means from excessively high voltage by transitioning to conduct current in parallel with said thermistor means in response to said thermistor means heating above a predetermined transition temperature to the extent that excessively high voltage is dropped across said thermistor means.

15. The circuit according to claim 14 wherein said thermistor means and said varistor as coupled in shunt relation therewith are disposed in heat conducting relation to one another.

16. A protection circuit adapted to transition from a low resistance state to a high resistance state, said circuit comprising:
- a pair of terminals between which a current is adapted to flow,
- thermistor means connected between said terminals, and
- a varistor coupled in shunt relation across said thermistor means to protect said thermistor means from excessively high voltage by conducting current in parallel with said thermistor means when said thermistor means heats above a predetermined transition temperature to the extent that excessively high voltage is dropped thereacross, and
- at least one additional shunt combination of thermistor means and a varistor, said additional combination being disposed in series with the parallel combination of the first mentioned thermistor means and varistor between said terminals.

17. The circuit according to claim 16 wherein the thermistor means and varistor of the additional combination are disposed in heat conducting relation with one another.

18. The circuit according to claim 17 wherein said combinations are disposed in heat conductive relation with one another.

19. The circuit according to claim 18 wherein said thermistor means and varistors comprise bulk devices and are bonded to one another for thermal conduction.

20. The circuit according to claim 19 wherein the thermistor means and varistor of each shunt pair comprise semi-cylindrical slugs joined to one another along axial cross sectional faces to complete a substantially solid cylindrical configuration for each shunt pair, successive shunt pairs being joined in heat conducting relation end-to-end.

21. The circuit according to claim 18 wherein a semi-cylindrical slug of one shunt pair comprising thermistor means adjoins a semi-cylindrical slug of a next adjacent shunt pair comprising a varistor.

* * * * *